(12) United States Patent
Kato et al.

(10) Patent No.: US 10,794,447 B2
(45) Date of Patent: Oct. 6, 2020

(54) BUMP STOPPER AND SHOCK ABSORBER

(71) Applicant: KYB Corporation, Tokyo (JP)

(72) Inventors: Hirohito Kato, Gifu (JP); Naoki Yamamoto, Gifu (JP)

(73) Assignee: KYB CORPORATION, Tokyo (JP)

( * ) Notice: Subject to any disclaimer, the term of this patent is extended or adjusted under 35 U.S.C. 154(b) by 90 days.

(21) Appl. No.: 15/773,249

(22) PCT Filed: Sep. 16, 2016

(86) PCT No.: PCT/JP2016/077582
§ 371 (c)(1),
(2) Date: May 3, 2018

(87) PCT Pub. No.: WO2017/086012
PCT Pub. Date: May 26, 2017

(65) Prior Publication Data
US 2018/0320752 A1    Nov. 8, 2018

(30) Foreign Application Priority Data

Nov. 20, 2015  (JP) .................................. 2015-227816

(51) Int. Cl.
*F16F 9/58* (2006.01)
*F16F 9/36* (2006.01)
(Continued)

(52) U.S. Cl.
CPC .................. *F16F 9/58* (2013.01); *F16F 9/32* (2013.01); *F16F 9/3242* (2013.01); *F16F 9/36* (2013.01);
(Continued)

(58) Field of Classification Search
CPC .... F16F 9/58; F16F 9/38; F16F 9/3207; F16F 9/3235; F16F 2230/0023; F16F 9/49; F16F 9/3242; F16F 13/24; F16F 9/43; F16F 9/54; B60G 15/067; B60G 2204/125; B60G 2204/45021; B60G 2206/42; B60G 2206/41; B60G 2204/1224; B60G 2204/4502
See application file for complete search history.

(56) References Cited

U.S. PATENT DOCUMENTS 3,346,272 A * 10/1967 Smith .................. B60G 13/008
                                                        280/124.147
4,364,457 A * 12/1982 Wossner ................. F16F 9/364
                                                        188/322.17
(Continued)

FOREIGN PATENT DOCUMENTS

| JP | S5820739 U | 2/1983 |
| JP | S60-71746 U | 5/1985 |

(Continued)

*Primary Examiner* — Bradley T King
*Assistant Examiner* — Mahbubur Rashid
(74) *Attorney, Agent, or Firm* — Rabin & Berdo, P.C.

(57) ABSTRACT

A bump stopper includes a cap, a stopper configured to receive a bump cushion, and a collar, wherein the cap includes a plate-shaped part having a rod hole into which a piston rod is inserted, and a cylindrical part configured to receive a cylinder, the stopper is provided to the plate-shaped part, and the collar provided to the plate-shaped part opposing the cylinder.

10 Claims, 11 Drawing Sheets

(51) Int. Cl.
*F16F 9/32* (2006.01)
*B60G 5/00* (2006.01)

(52) U.S. Cl.
CPC .............. *F16F 9/362* (2013.01); *F16F 9/366* (2013.01); *B60G 5/00* (2013.01)

(56) References Cited

U.S. PATENT DOCUMENTS

| | | | | |
|---|---|---|---|---|
| 4,397,452 A * | 8/1983 | Fouts | ........................ | F16F 9/49 188/284 |
| 4,438,834 A * | 3/1984 | Handke | .................. | F16F 9/364 188/315 |
| 4,724,938 A * | 2/1988 | Horvath | .................. | F16F 9/364 188/322.17 |
| 4,795,010 A * | 1/1989 | Kaneko | ................ | B60G 15/063 188/322.19 |
| 4,828,232 A * | 5/1989 | Harrod | .................... | F16F 9/084 188/322.12 |
| 5,078,370 A * | 1/1992 | McClellan | ........... | B60G 15/068 267/220 |
| 5,667,041 A * | 9/1997 | Jensen | .................... | F16F 9/364 188/275 |
| 6,186,486 B1 * | 2/2001 | Gutman | ................ | B60G 13/003 188/322.12 |
| 6,217,012 B1 * | 4/2001 | Hashirayama | ....... | B60G 15/063 188/322.17 |
| 7,810,619 B2 * | 10/2010 | Maeda | .................. | F16F 9/3242 188/322.17 |
| 7,866,452 B2 * | 1/2011 | Brehm | .................... | F16F 9/585 188/284 |
| 8,191,692 B2 * | 6/2012 | Mori | ...................... | F16F 9/585 188/284 |
| 8,991,572 B2 * | 3/2015 | Wang | ........................ | F16F 9/36 188/315 |
| 9,145,036 B2 * | 9/2015 | Baek | .................... | B60G 15/065 |
| 2009/0194379 A1 | 8/2009 | Maeda | | |
| 2012/0248670 A1 * | 10/2012 | Yamashita | ................ | F16F 9/49 267/226 |
| 2016/0084336 A1 * | 3/2016 | Tsunekawa | ............ | F16F 9/585 188/322.12 |
| 2016/0215848 A1 * | 7/2016 | Fukui | ........................ | F16F 9/58 |

FOREIGN PATENT DOCUMENTS

| | | |
|---|---|---|
| JP | S62-166345 U | 10/1987 |
| JP | H09-317811 A | 12/1997 |
| JP | 4048083 B2 | 2/2008 |

* cited by examiner

BUMP STOPPER AND SHOCK ABSORBER

TECHNICAL FIELD

The present invention relates to a bump stopper, and a shock absorber including the bump stopper.

BACKGROUND ART

A bump stopper that absorbs shocks generated during maximum contraction of a shock absorber is known (JP 4048083 B2, JP 9-317811 A). The bump stoppers disclosed in JP 4048083 B2 and JP 9-317811 A are mounted on an end of a cylinder body into which a piston rod is movably inserted, or mounted on an end of an outer tube that accommodates a cylinder body. Shocks during maximum contraction of the piston rod are absorbed by the bump stopper and a bump cushion provided to the top end of the piston rod.

The bump stopper disclosed in JP 4048083 B2 includes the following: a horizontal plate that receives a bump cushion; a folded part that extends downwards from the horizontal plate and is folded; and a communication hole formed in the folded part. An insertion hole into which the piston rod is inserted is provided to the center of the horizontal plate. The folded part is disposed on an end of a cylinder body in a state in which the piston rod is inserted into the insertion hole of the horizontal plate, and the folded part secures a space between the horizontal plate and the cylinder body. Muddy water and dust that have flowed into this space from a gap between the horizontal plate and the piston rod is discharged to the outside of the bump stopper via the communication hole of the folded part.

JP 9-317811 A discloses a disc-shaped bump stopper. A protrusion is formed on the bottom surface of the disc-shaped bump stopper. The distal end of the protrusion is welded to a caulked part of an outer tube of a shock absorber, and a space is secured between a flat plate of the bump stopper and the caulked part by the protrusion. Dust that has flowed into this space from a gap between the bump stopper and a piston rod is discharged via a passage formed on the bottom surface of the flat plate.

SUMMARY OF INVENTION

In the bump stopper disclosed in JP 4048083 B2, the folded part is formed by folding a pipe material or a flat plate by press machining. In the folded part, the folding angle is large (about 180 degrees), and thus cracks can easily form in the folded part when folding the pipe material or flat plate. Consequently, the manufacturing of such a bump stopper requires advanced technology.

In the bump stopper disclosed in JP 9-317811 A, the protrusion is formed by depressing a portion of the top surface of the flat plate. Therefore, the bump stopper can easily be deformed back to its original flat plate shape having no protrusion or recess when the shock absorber contracts to the maximum degree and receives a shock from the bump cushion, and thus the bump stopper may not have sufficient strength.

In this way, the bump stoppers disclosed in JP 4048083 B2 and JP 9-317811 A have a complex shape due to the folded part or the protrusion, and thus these bump stoppers are not only difficult to manufacture but also may not have sufficient strength.

An object of the present invention is to provide a bump stopper that is easy to manufacture and has sufficient strength.

The present invention relates to a bump stopper for absorbing shocks generated during maximum contraction of a shock absorber in cooperation with a bump cushion. According to one aspect of the present invention, the bump stopper includes a cap including a plate-shaped part having a rod hole into which a piston rod of the shock absorber is inserted, and a cylindrical part configured to receive a portion of a cylinder of the shock absorber, a stopper provided to the plate-shaped part, the stopper being configured to receive the bump cushion, and a collar provided to the plate-shaped part opposing the cylinder.

DESCRIPTION OF EMBODIMENTS

Embodiments of the present invention will now be explained below referring to the drawings. Herein, a hydraulic shock absorber in which hydraulic oil is used as a working fluid shall be explained, but other fluids such as a working water may also be used as the working fluid.

First Embodiment

First, referring to FIGS. 1 to 4C, a bump stopper 100 according to a first embodiment of the present invention and a shock absorber 1 equipped with the bump stopper 100 will be explained. The shock absorber 1 is provided, for example, between a vehicle body 5 and a wheel shaft (not illustrated) of a vehicle, and generates a damping force to suppress vibrations of the vehicle body 5.

Figure 1:
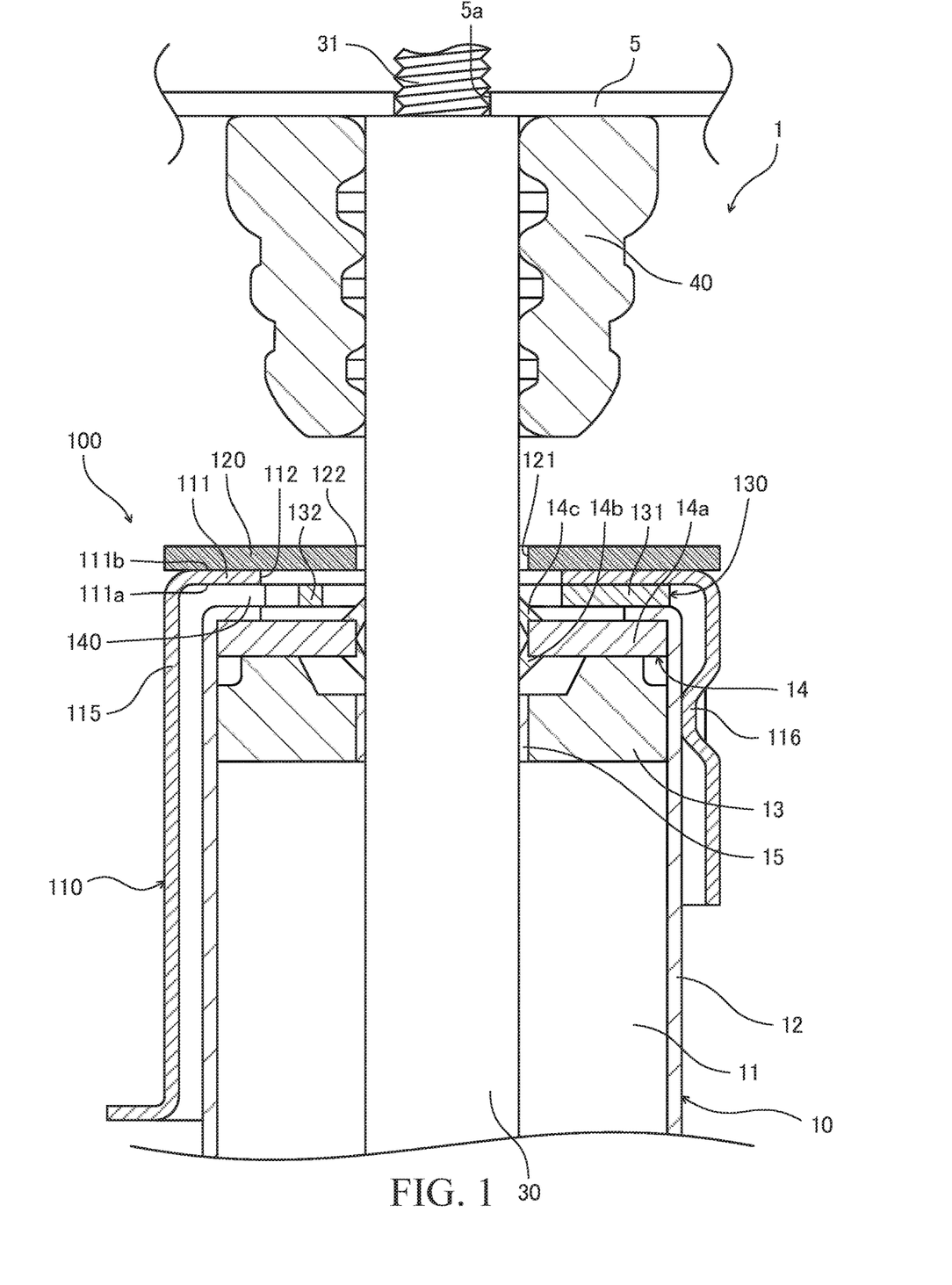
FIG. 1 is a cross-section view of a shock absorber provided with a bump stopper according to a first embodiment of the present invention.

As shown in FIG. 1, the shock absorber 1 includes a cylinder 10 in which hydraulic oil is sealed, and a piston rod 30 inserted into the cylinder 10 such that the piston rod 30 can move into and out of the cylinder 10. A piston (not illustrated) is slidably accommodated in the cylinder 10, and one end of the piston rod 30 is connected to the piston. The inside of the cylinder 10 is partitioned by the piston into an extension-side chamber 11 and a contraction-side chamber (not illustrated).

The cylinder 10 includes the following: an approximately cylindrical tube 12; a rod guide 13 provided to one end of the tube 12; and an oil seal 14. The rod guide 13 and the oil seal 14 are fixed to the tube 12 by bending the end of the tube 12 toward the inside.

The rod guide 13 is formed in an annular shape, and a bush 15 is provided to the inner periphery of the rod guide 13. The piston rod 30 is slidably supported by the rod guide 13 via the bush 15.

The oil seal 14 includes an annular base metal 14a, and lips 14b, 14c provided to the inner periphery of the base metal 14a. The lips 14b, 14c are joined to the base metal 14a by vulcanization adhesion.

The lip 14b slidingly contacts the piston rod 30, and prevents hydraulic oil within the cylinder 10 from leaking to the outside. The lip 14c slidingly contacts the piston rod 30, and prevents foreign contaminants from flowing into the cylinder 10.

A male screw 31 is formed on the other end of the piston rod 30. A nut (not illustrated) threadably engages with the male screw 31 in a state in which the male screw 31 is inserted into a hole 5a of the vehicle body 5, and thereby the piston rod 30 is fixed to the vehicle body 5.

A bottom member (not illustrated) is attached to the other end of the tube 12, and the opening of the tube 12 is blocked by the bottom member. A connection part (not illustrated) to be attached to the wheel shaft is provided to the bottom member, and the bottom member (cylinder 10) is connected by the connection part.

The aforementioned piston includes first and second piston passages that allow the extension-side chamber 11 to communicate the contraction-side chamber. First and second damping valves are provided respectively to the first and second piston passages.

The first damping valve is opened by a pressure difference between the contraction-side chamber and the extension-side chamber 11 during contraction of the shock absorber 1, and thereby the first damping valve opens the first piston passage and applies resistance to the flow of hydraulic oil moving from the contraction-side chamber to the extension-side chamber 11 via the first piston passage. The first damping valve closes the first piston passage during extension of the shock absorber 1.

The second damping valve is opened by a pressure difference between the extension-side chamber 11 and the contraction-side chamber during extension of the shock absorber 1, and thereby the second damping valve opens the second piston passage and applies resistance to the flow of hydraulic oil moving from the extension-side chamber 11 to the contraction-side chamber via the second piston passage. The second damping valve closes the second piston passage during contraction of the shock absorber 1.

In this way, the shock absorber 1 generates a damping force in accordance with the extension/contraction operations to suppress vibrations of the vehicle body 5.

The shock absorber 1 further includes a bump cushion 40 provided to the outer periphery of the piston rod 30 between the cylinder 10 and the vehicle body 5, and the bump stopper 100 attached to the cylinder 10.

The bump cushion 40 is made of a contractible material. When the bump cushion 40 abuts the bump stopper 100 and contracts during contraction of the shock absorber 1, shocks generated by the operation of the shock absorber 1 are absorbed. In this way, the bump stopper 100 cooperates with the bump cushion 40 to absorb shocks generated during maximum contraction of the shock absorber 1.

Figure 2:
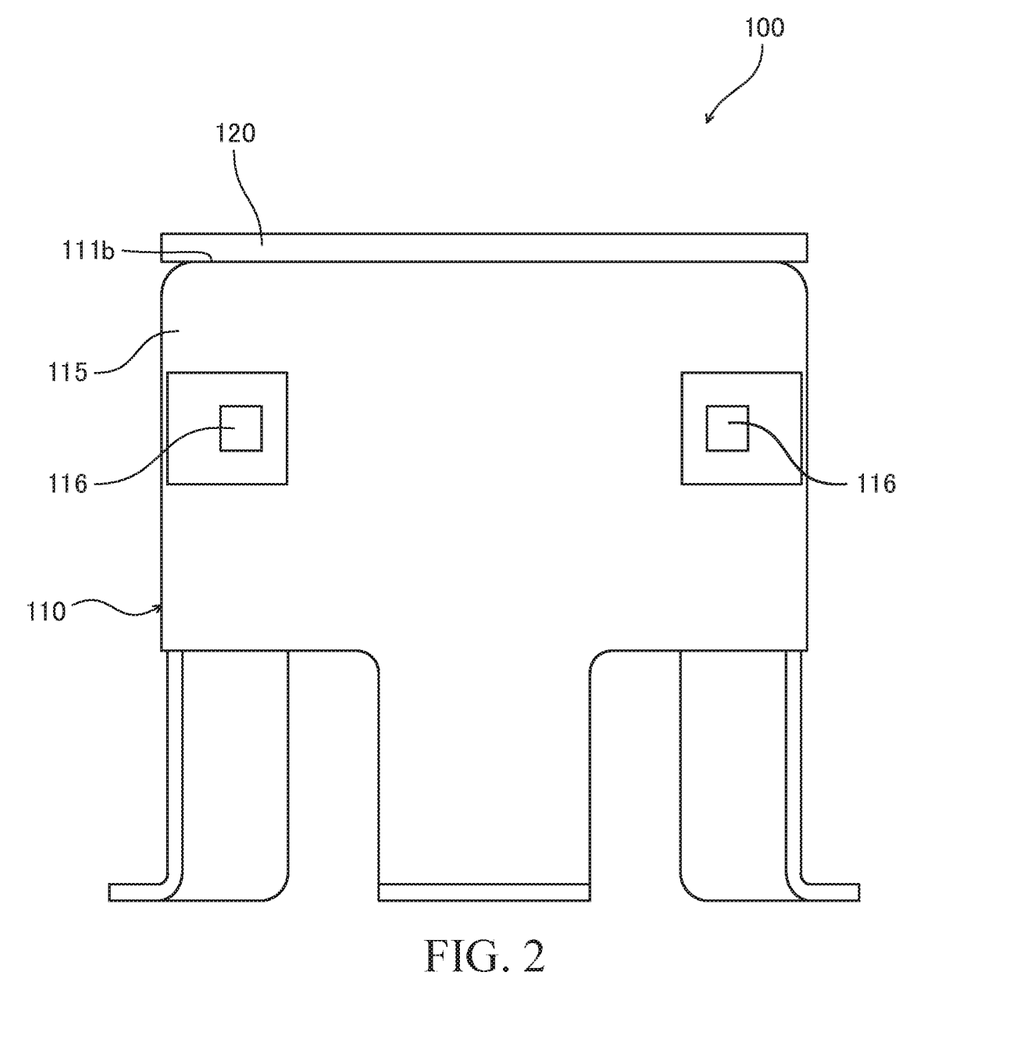
FIG. 2 is a front view of the bump stopper shown in FIG. 1.
Figure 3:
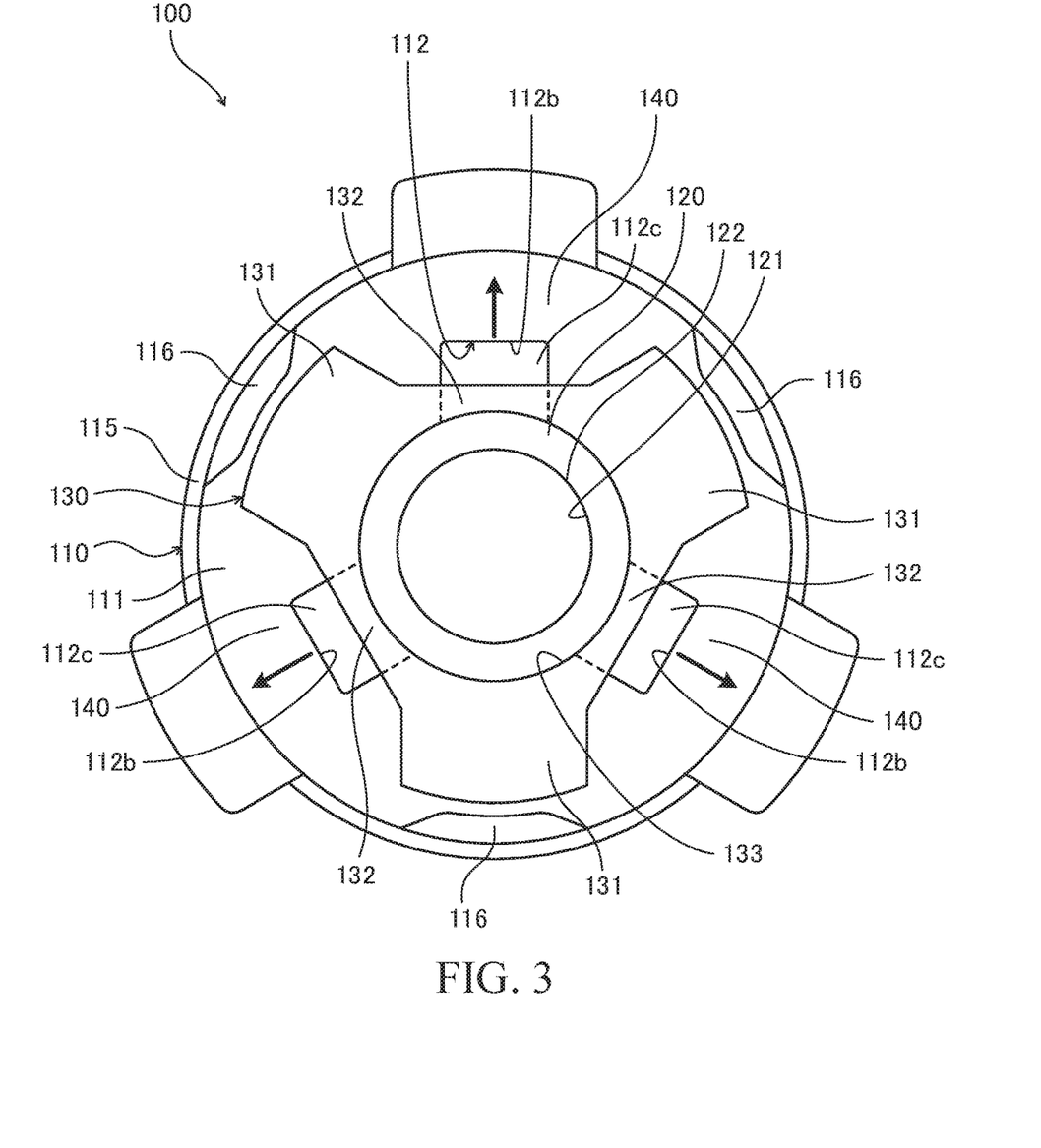
FIG. 3 is a bottom view of the bump stopper shown in FIG. 1.

As shown in FIGS. 1 to 3, the bump stopper 100 includes the following: a cap 110 that covers the top end side of the cylinder 10; a stopper 120 that is supported by the cap 110; and a collar 130 that is provided to the inside of the cap 110.

The cap 110 is provided with a plate-shaped part 111 having a first rod hole 112 into which the piston rod 30 can be inserted, and a cylindrical part 115 which can receive the top end side of the cylinder 10. The first rod hole 112 is formed so as to penetrate between a first surface (inner surface) 111a and a second surface (outer surface) 111b of the plate-shaped part 111. Hereinafter, the first rod hole 112 will also be referred to simply as the "rod hole 112".

Figure 4A:
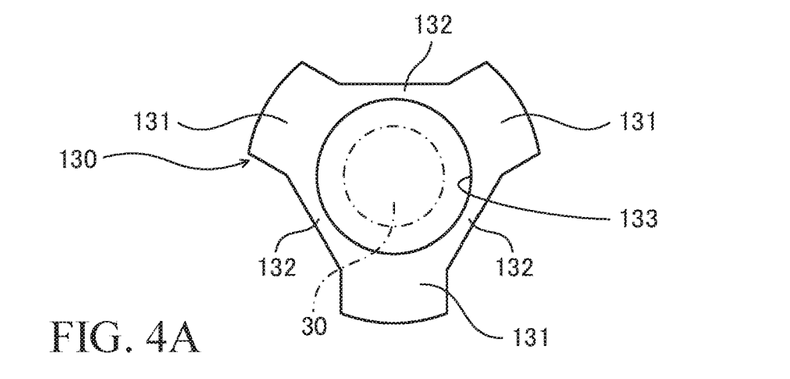
FIG. 4A is a bottom view of a collar shown in FIGS. 1 and 3.
Figure 4B:
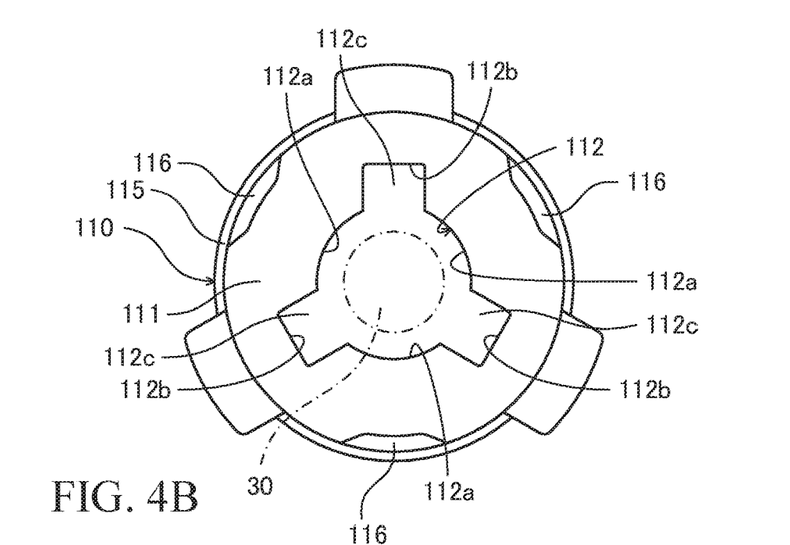
FIG. 4B is a bottom view of a cap shown in FIGS. 1 and 3.
Figure 4C:
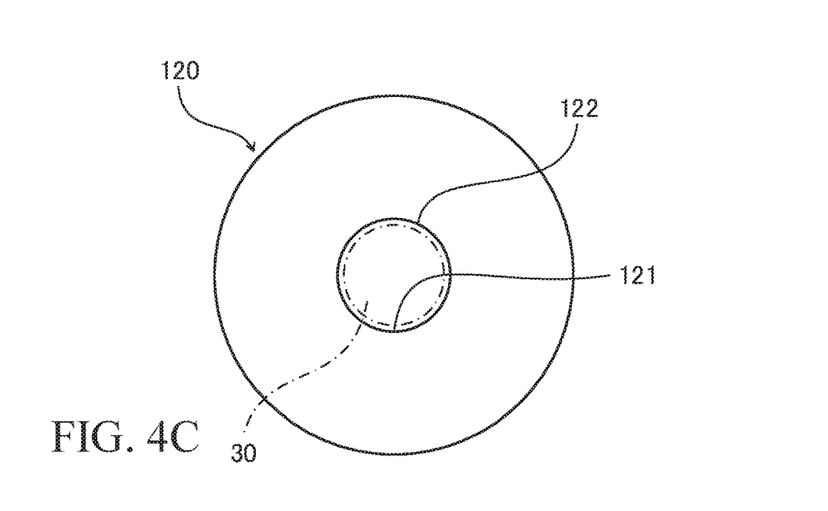
FIG. 4C is a bottom view of a stopper shown in FIGS. 1 and 3.

FIGS. 4A, 4B, and 4C are bottom surface views of the collar 130, the cap 110, and the stopper 120, respectively. In FIGS. 4A, 4B, and 4C, the piston rod 30 is depicted with dot-dash lines.

As shown in FIG. 4B, the rod hole 112 is positioned in approximately the center of the plate-shaped part 111. The inner peripheral surface of the rod hole 112 includes the following: a plurality of curved surface parts 112a formed in an arc shape; and a plurality of recessed surface parts 112b formed so as to be recessed from the curved surface parts 112a toward the outside of the plate-shaped part 111. Openings 112c which are approximately rectangular shaped are defined by the recessed surface parts 112b.

In the present embodiment, each recessed surface part 112b is formed by three flat surfaces, but each recessed surface part 112b may be formed by a single curved surface. If each recessed surface part 112b is formed by a single curved surface, the openings 112c are defined in an approximately semicircular shape.

The center of each arc-shaped curved surface part 112a is approximately the same, and the curvature radius of each curved surface part 112a is larger than the radius of the piston rod 30. Therefore, in a state in which the bump stopper 100 is attached to the cylinder 10 (refer to FIG. 1), a gap is formed between the inner wall surface of the rod hole 112 and the piston rod 30.

As shown in FIGS. 1 to 3, the cylindrical part 115 is formed to be continuous with the plate-shaped part 111. In a state in which the cylindrical part 115 has received the cylinder 10, the inner surface 111a of the plate-shaped part 111 opposes the end surface (oil seal 14) of the cylinder 10.

The cylindrical part 115 has a plurality of protrusions 116 that protrude toward the inside. The plurality of protrusions 116 are formed by depressing the outer peripheral surface of the cylindrical part 115. In a state in which the cylindrical part 115 has received the cylinder 10, the plurality of protrusions 116 abut the outer peripheral surface of the cylinder 10 so as to push open the cylindrical part 115. Therefore, a relatively large force is necessary to pull out the cylinder 10 from the cap 110, and the cap 110 can be prevented from coming off of the cylinder 10.

The stopper 120 is provided to the outer surface 111b of the plate-shaped part 111, and is fixed to the cap 110 by projection welding. The bump cushion 40 is received and stopped by the stopper 120 during contraction of the shock absorber 1.

A circular second rod hole 121 is formed in approximately the center of the stopper 120 (refer to FIG. 4C). The bump stopper 100 is attached to the cylinder 10 in a state in which the piston rod 30 is inserted into the second rod hole 121.

The inner peripheral surface of the second rod hole 121 of the stopper 120 is positioned more toward the inside than the inner peripheral surface of the rod hole 112 of the plate-shaped part 111. Therefore, the gap between the stopper 120 and the piston rod 30 is smaller than the gap between the plate-shaped part 111 and the piston rod 30. Thus, regardless of the size of the rod hole 112 of the plate-shaped part 111, the bump cushion 40 does not readily enter into the gap between the stopper 120 and the piston rod 30, and breakage of the bump cushion 40 can be prevented.

Since the stopper 120 is provided to the outer surface 111b of the plate-shaped part 111, the stopper 120 is separated from the oil seal 14 in the axial direction of the piston rod 30. Therefore, even if the gap between the stopper 120 and the piston rod 30 is narrowed, contact between the stopper 120 and the oil seal 14 (more specifically, the lip 14c) can be prevented.

Since the gap between the plate-shaped part 111 and the piston rod 30 is larger than the gap between the stopper 120 and the piston rod 30, the inner peripheral surface of the rod hole 112 of the plate-shaped part 111 is separated from the lip 14c in the radial direction of the piston rod 30. Therefore, even if the interval between the plate-shaped part 111 and the cylinder 10 is narrowed, contact between the plate-shaped part 111 and the lip 14c can be prevented.

The collar 130 is provided to the inner surface 111a of the plate-shaped part 111, and is fixed to the cap 110 by projection welding. In a state in which the bump stopper 100 is attached to the cylinder 10, the collar 130 opposes the cylinder 10 and separates the plate-shaped part 111 and the cylinder 10. Therefore, the stopper 120 is sufficiently separated from the oil seal 14, and contact between the stopper 120 and the oil seal 14 can be more reliably prevented.

As shown in FIGS. 3 and 4A, the collar 130 includes: a plurality of support parts 131 that support the plate-shaped part 111; and a plurality of connection parts 132 that connect adjacent support parts 131. The plurality of support parts 131 are integrated by the connections parts 132. In other words, the collar 130 is formed as a single member. Therefore, when attaching the collar 130 to the cap 110, the collar 130 can be easily handled. The same effect is achieved in the second and third embodiments to be explained below.

A circular third rod hole 133 is formed in the collar 130 by the plurality of support parts 131 and the plurality of connection parts 132. The bump stopper 100 is attached to the cylinder 10 in a state in which the piston rod 30 is inserted into the third rod hole 133 of the collar 130.

The radius of the third rod hole 133 of the collar 130 matches the curvature radius of the curved surface parts 112a of the plate-shaped part 111, and the inner peripheral surface of the third rod hole 133 and the curved surface parts 112a are continuous without any level differences therebetween. Since the gap between the plate-shaped part 111 and the piston rod 30 is larger than the gap between the stopper 120 and the piston rod 30, the inner peripheral surface of the third rod hole 133, which is continuous with the curved surface parts 112a of the plate-shaped part 111 without any level differences therebetween, is sufficiently separated from the lip 14c in the radial direction of the piston rod 30. Therefore, contact between the collar 130 and the lip 14c is prevented.

The plurality of support parts 131 are arranged in a radial manner between adjacent openings 112c. Thereby, radial-shaped passages 140 which communicate with the openings 112c of the rod hole 112 are formed between adjacent support parts 131. The passages 140 communicate with the outside of the cylindrical part 115 via the gap between the outer peripheral surface of the cylinder 10 and the inner peripheral surface of the cylindrical part 115.

The "outside of the cylindrical part 115" indicates the spaces excluding the inside of the cylindrical part 115. Specifically, in FIG. 1, the "outside of the cylindrical part 115" includes the space to the left side of the left end of the cylindrical part 115, the space to the right side of the right end of the cylindrical part 115, the space on the top side of the top end of the cylindrical part 115, and the space on the bottom side of the bottom end of the cylindrical part 115. In the present embodiment, the passages 140 communicate with the space on the bottom side of the bottom end of the cylindrical part 115 via the gap between the outer peripheral surface of the cylinder 10 and the inner peripheral surface of the cylindrical part 115.

Since the passages 140 are formed between adjacent support parts 131, the passage forming portions of the plate-shaped part 111 are supported by the support parts 131 on both sides, and thus these passage forming portions do not easily deform. Therefore, deformation of the cross-section shape of the passages 140 can be prevented, and fluid and dust that have flowed into the cap 110 from the rod hole 112 of the plate-shaped part 111 can be more reliably discharged to the outside of the cap 110.

A flow of air is generated around the bump cushion 40 in accordance with the contraction of the bump cushion 40. Due to this flow of air, air and dust may flow into the gap between the inner peripheral surface of the rod hole 112 of the plate-shaped part 111 and the piston rod 30. Further, liquid, i.e. water, may flow into the gap between the inner peripheral surface of the rod hole 112 of the plate-shaped part 111 and the piston rod 30.

In the present embodiment, the passages 140 allow the rod hole 112 of the plate-shaped part 111 to communicate with the outside of the cylindrical part 115 via the inside of the cylindrical part 115. Therefore, fluid and dust that have flowed into the gap between the inner peripheral surface of the rod hole 112 of the plate-shaped part 111 and the piston rod 30 is discharged to the outside of the cap 110 via the openings 112c of the rod hole 112 and the passages 140.

The connection parts 132 straddle over the openings 112c of the rod hole 112 so as to extend more toward the inside in the radial direction than the recessed surface parts 112b. Therefore, the passages 140 communicate with the openings 112c of the rod hole 112. Thus, the flow in the passages 140 is not blocked by the connection parts 132, and fluid and dust that flow into the cap 110 from the rod hole 112 can be more reliably discharged to the outside of the cap 110.

The connection parts 132 are not depressed relative to the support parts 131, and are formed in a planar shape along the support parts 131. Therefore, the collar 130 is simple. In addition, the collar can be produced easily because it is not necessary to consider a gap between the connection parts 132 and the stopper 120 so as to avoid contact between the connection parts 132 and the stopper 120.

The flow passage cross-section of the passages 140 is larger than the flow passage cross-section in the gap between the stopper 120 and the piston rod 30. Therefore, fluid and dust that have flowed into the passages 140 from this gap do not easily stagnate within the passages 140. Thus, fluid and dust that have flowed into the cap 110 from the rod hole 112 can be more reliably discharged to the outside of the cap 110.

In the present embodiment, since the passages 140 that allow the rod hole 112 to communicate with the outside of the cap 110 are formed by the cap 110 and the collar 130, it is not necessary to form the cap 110 in a complex shape. Therefore, the bump stopper 100 can be formed easily and reductions in the strength of the bump stopper 100 can be prevented.

Figure 5:
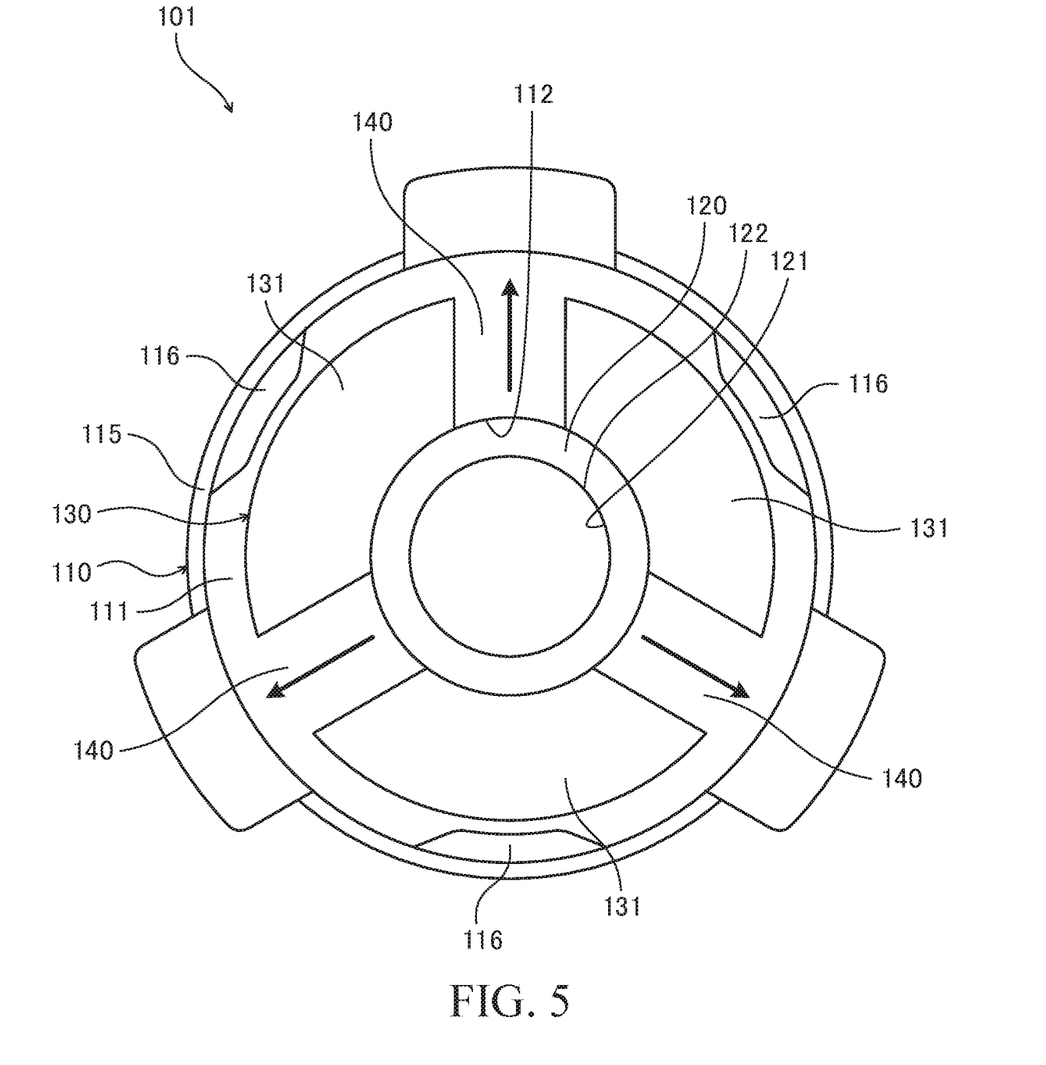
FIG. 5 is a bottom view of a bump stopper according to an alternative embodiment of the first embodiment.

FIG. 5 is a bottom view illustrating a bump stopper 101 according to an alternative embodiment of the present embodiment. As shown in FIG. 5, the circular rod hole 112 is formed in the plate-shaped part 111. Further, the collar 130 does not include portions corresponding to the connection parts 132 (refer to FIGS. 3 and 4A), and the plurality of support parts 131 are separated from each other. In this bump stopper 101 as well, the passages 140 are formed by the collar 130 and the cap 110. Therefore, the bump stopper 101 can be formed easily and reductions in the strength of the bump stopper 101 can be prevented.

In the bump stopper 101, since the plurality of support parts 131 are separated from each other, there are no members such as the connection parts 132 between adjacent support parts 131, and thus the width of the passages 140 is expanded. Therefore, flow resistance in the passages 140 can be reduced, and fluid and dust that have flowed into the cap 110 from the rod hole 121 can be more reliably discharged to the outside of the cap 110.

Next, the operation of the shock absorber 1 will be explained. Since the bump stopper 100 cooperates with the bump cushion 40 to absorb shocks only when the shock absorber 1 contracts, herein, only the contraction operation of the shock absorber 1 will be explained.

Figure 6:
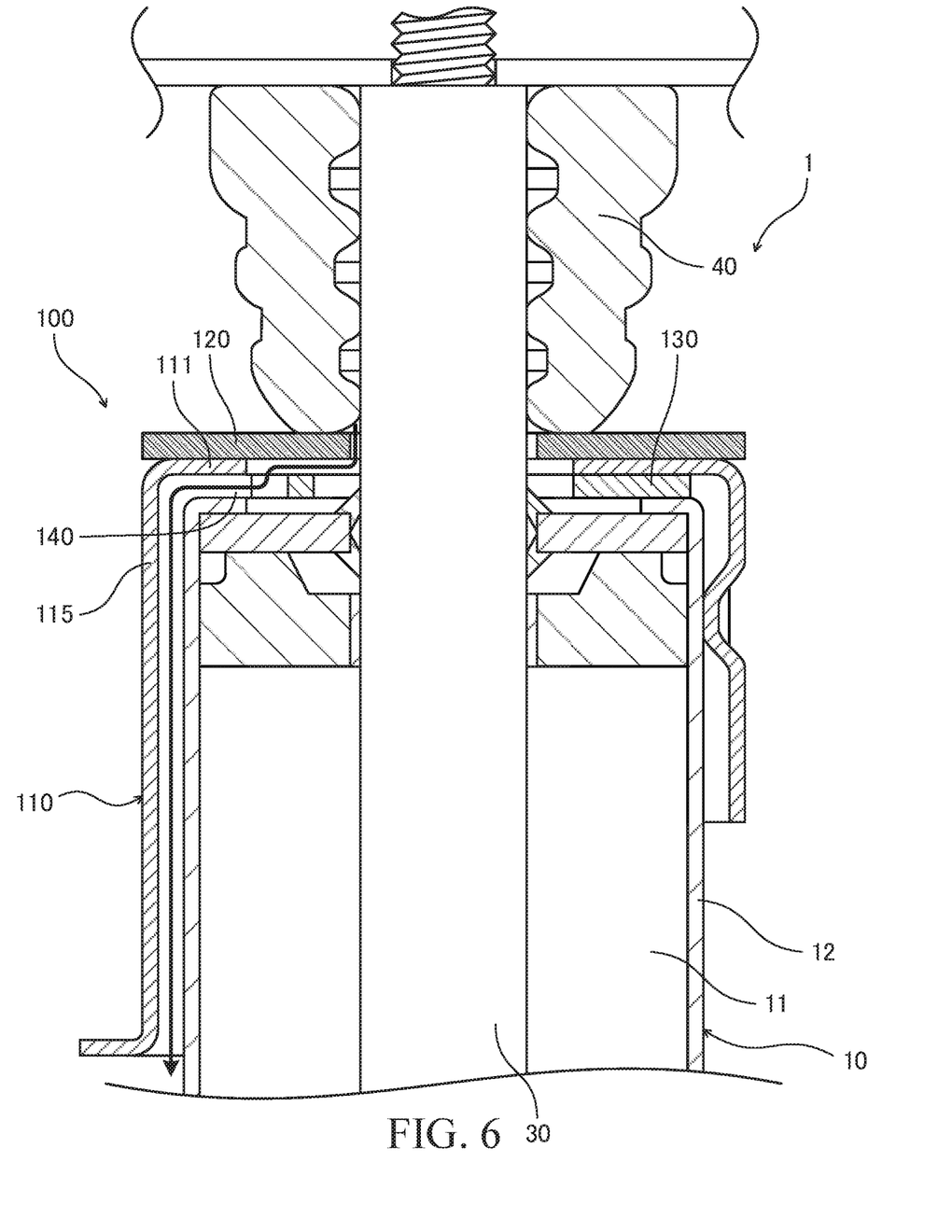
FIG. 6 is a cross-section view of the shock absorber shown in FIG. 1, and illustrates a state in which the shock absorber is contracted.

When the shock absorber 1 contracts, the bump cushion 40 abuts the bump stopper 100 (refer to FIG. 6). Shocks generated during maximum contraction of the shock absorber 1 are absorbed by the contraction of the bump cushion 40.

A flow of air is generated around the bump cushion 40 in accordance with the contraction of the bump cushion 40. At this time, fluid and dust flow into the gap between the inner peripheral surface of the rod hole 112 of the plate-shaped part 111 and the piston rod 30.

Fluid and dust that have flowed into the gap between the inner peripheral surface of the rod hole 112 of the plate-shaped part 111 and the piston rod 30 is discharged to the outside of the cap 110 via the passages 140 (the passages indicated by the arrow mark in FIG. 6). Therefore, increases in the pressure within the cap 110 and accumulations of dust within the cap 110 can be prevented.

Second Embodiment

Next, referring to FIGS. 7 to 9, a bump stopper 200 according to a second embodiment of the present invention will be explained. Constituent elements which are the same as those in the first embodiment will be assigned the same reference numerals, and explanations thereof will be omitted.

Figure 7:
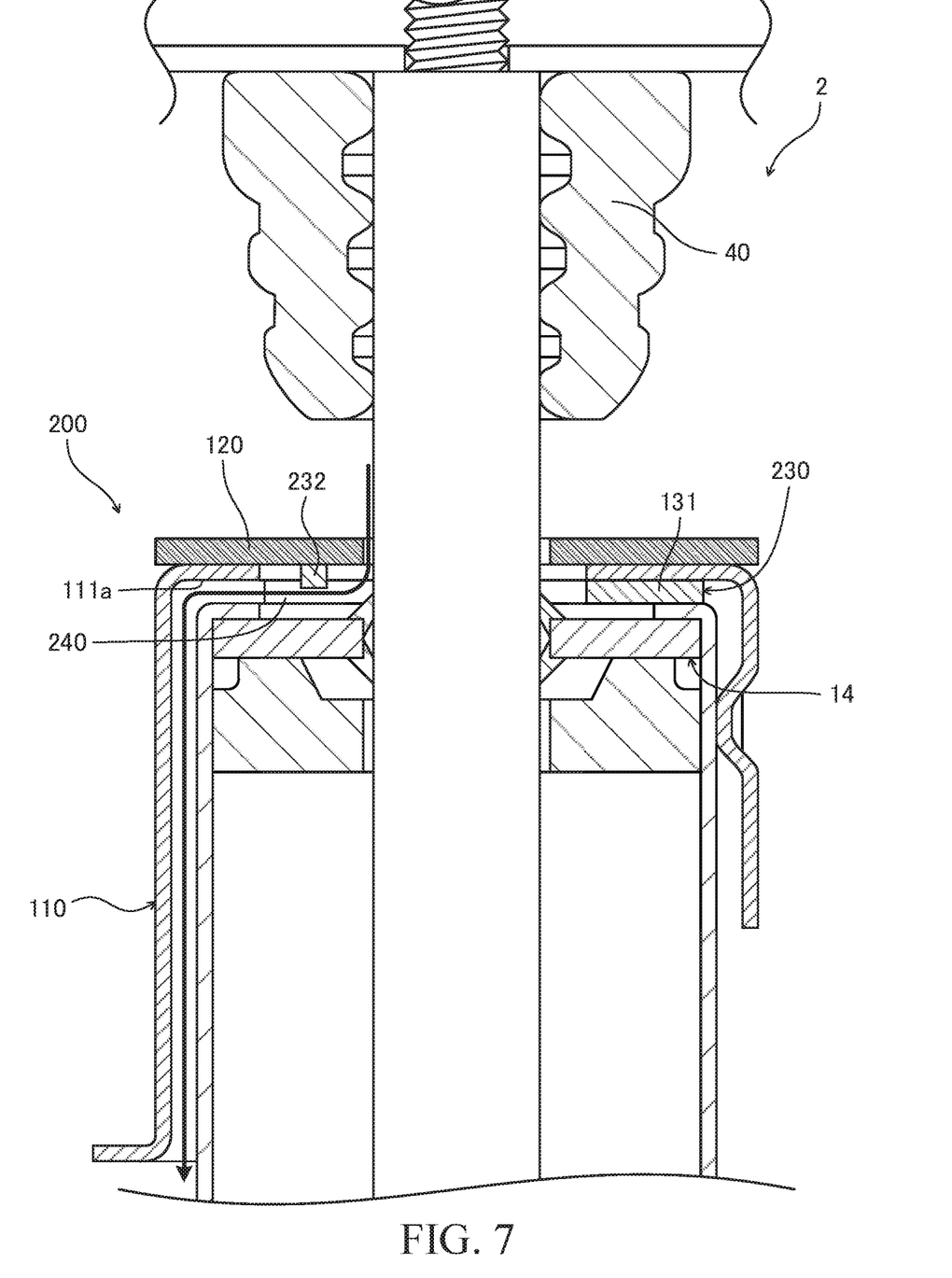
FIG. 7 is a cross-section view of a shock absorber provided with a bump stopper according to a second embodiment of the present invention.
Figure 8:
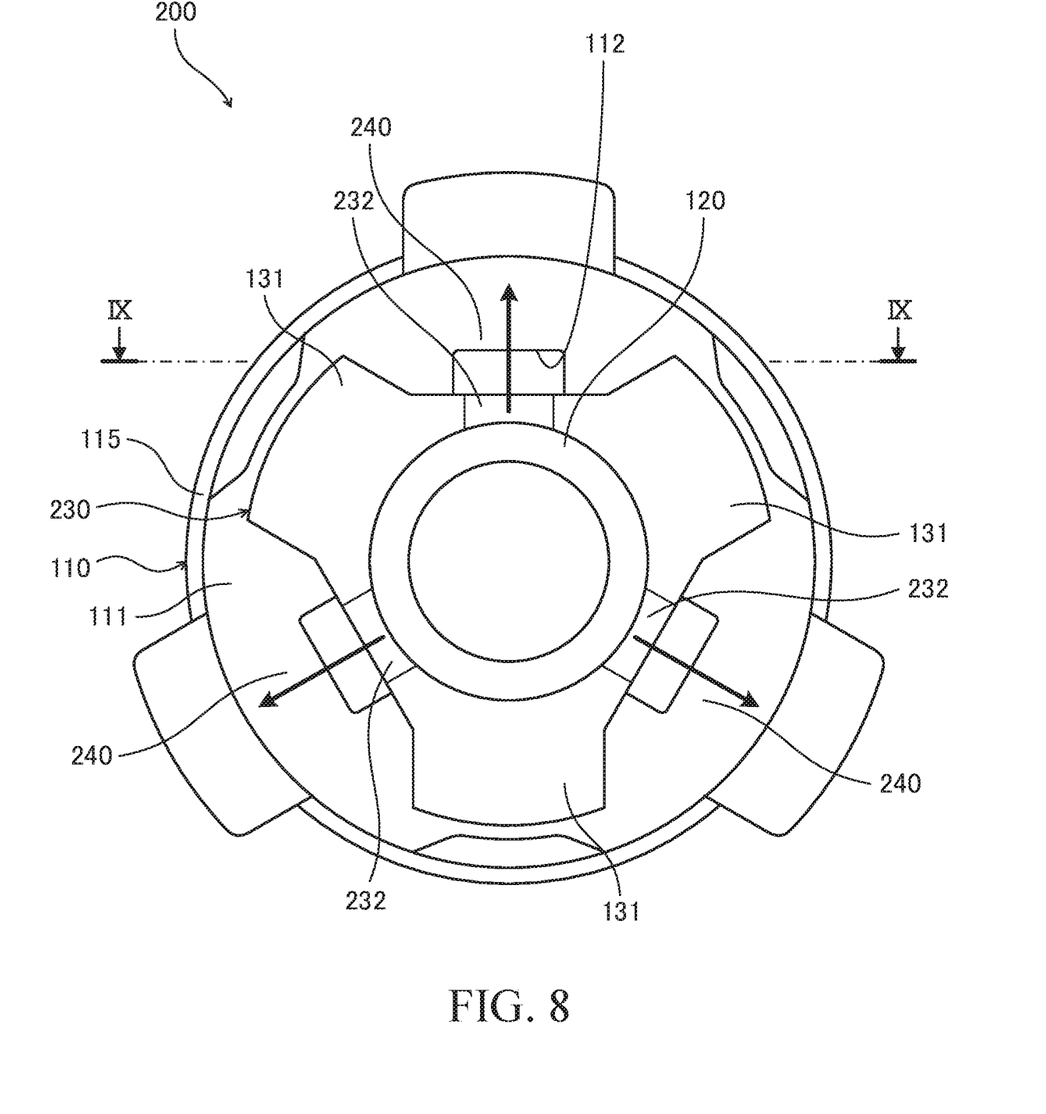
FIG. 8 is a bottom view of the bump stopper shown in FIG. 7.

FIG. 7 is a cross-section view of a shock absorber 2 provided with the bump stopper 200. FIG. 8 is a bottom view of the bump stopper 200. FIG. 9 is a cross-section view along line IX-IX shown in FIG. 8.

The bump stopper 200 includes the following: the cap 110; the stopper 120; and a collar 230 provided to the inside of the cap 110. The collar 230 includes a plurality of support parts 131, and a plurality of connection parts 232 which connect adjacent support parts 131.

The connection parts 232 are depressed in the axial direction of the piston rod 30 relative to the support parts 131 so that the connection parts 232 enter into the rod hole 112. Specifically, as shown in FIG. 9, each connection part 232 includes base parts 232a formed to be continuous with the support parts 131, and a middle part 232b formed to be continuous with the base parts 232a. The base parts 232a are bent toward the stopper 120, and the middle part 232b contacts the stopper 120.

Figure 9:
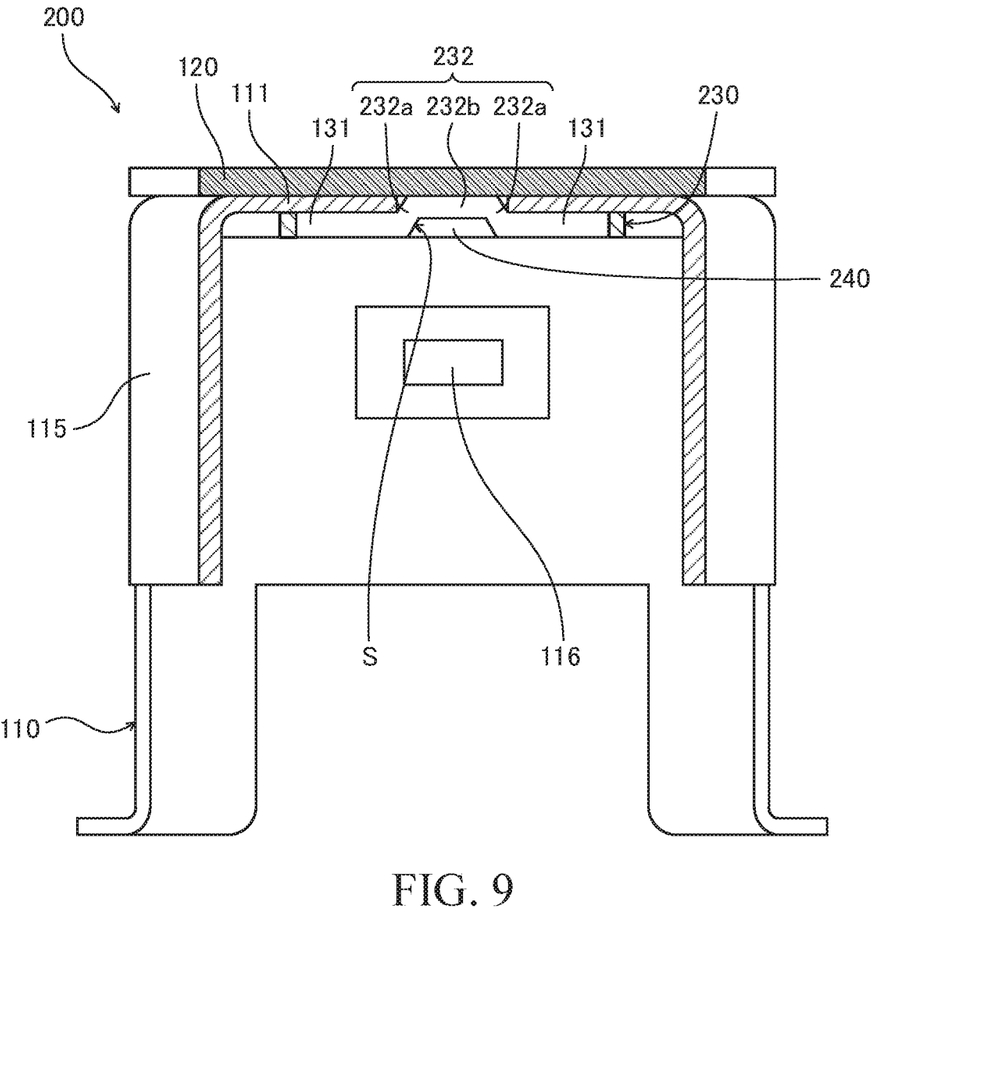
FIG. 9 is a cross-section view along line IX-IX shown in FIG. 8.

In the embodiment shown in FIG. 9, the thickness of the connection parts 232 is approximately equal to the thickness of the support parts 131, and the depression of the connection parts 232 is formed by bending the base parts 232a. Therefore, the connection parts protrude in the axial direction of the piston rod 30 relative to the support parts 131.

The depression of the connection parts 232 may be formed without bending the base parts 232a. For example, the depression may be formed by making the thickness of the connection parts 232 less than the thickness of the support parts 131.

In addition to the effects achieved by the bump stopper 100 according to the first embodiment, the bump stopper 200 also achieves the following effects.

Since the connection parts 232 are depressed, passages 240 are formed linearly along the end surface of the cylinder 10 (surface of the oil seal 14) between the connection parts 232 and the cylinder 10 as shown in FIG. 7. Therefore, flow resistance in the passages 240 can be reduced, and fluid and dust that have flowed into the cap 110 from the rod hole 112 can be more reliably discharged to the outside of the cap 110. The same effects are also achieved in the third embodiment to be explained below.

The connection parts 232 do not have to contact the stopper 120. Further, the connection parts 232 may contact the inner wall surface of the rod hole 112.

The operation of the shock absorber 2 is basically the same as that of the shock absorber 1, and thus an explanation thereof will be omitted herein.

Third Embodiment

Next, referring to FIGS. 10 and 11, a bump stopper 300 according to a third embodiment of the present invention will be explained. Constituent elements which are the same as those in the first and second embodiments will be assigned the same reference numerals, and explanations thereof will be omitted.

Figure 10:
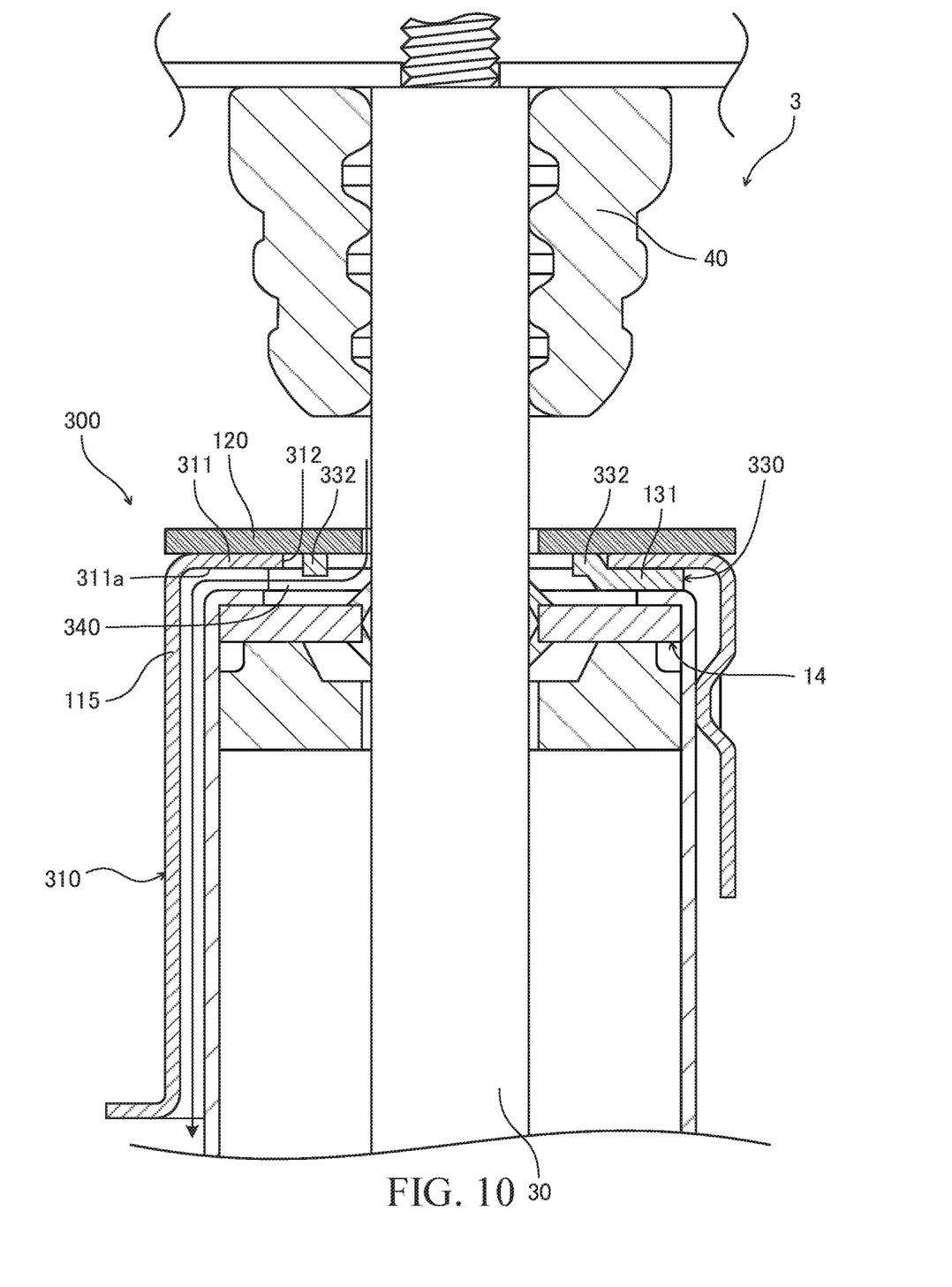
FIG. 10 is a cross-section view of a shock absorber provided with a bump stopper according to a third embodiment of the present invention.
Figure 11:
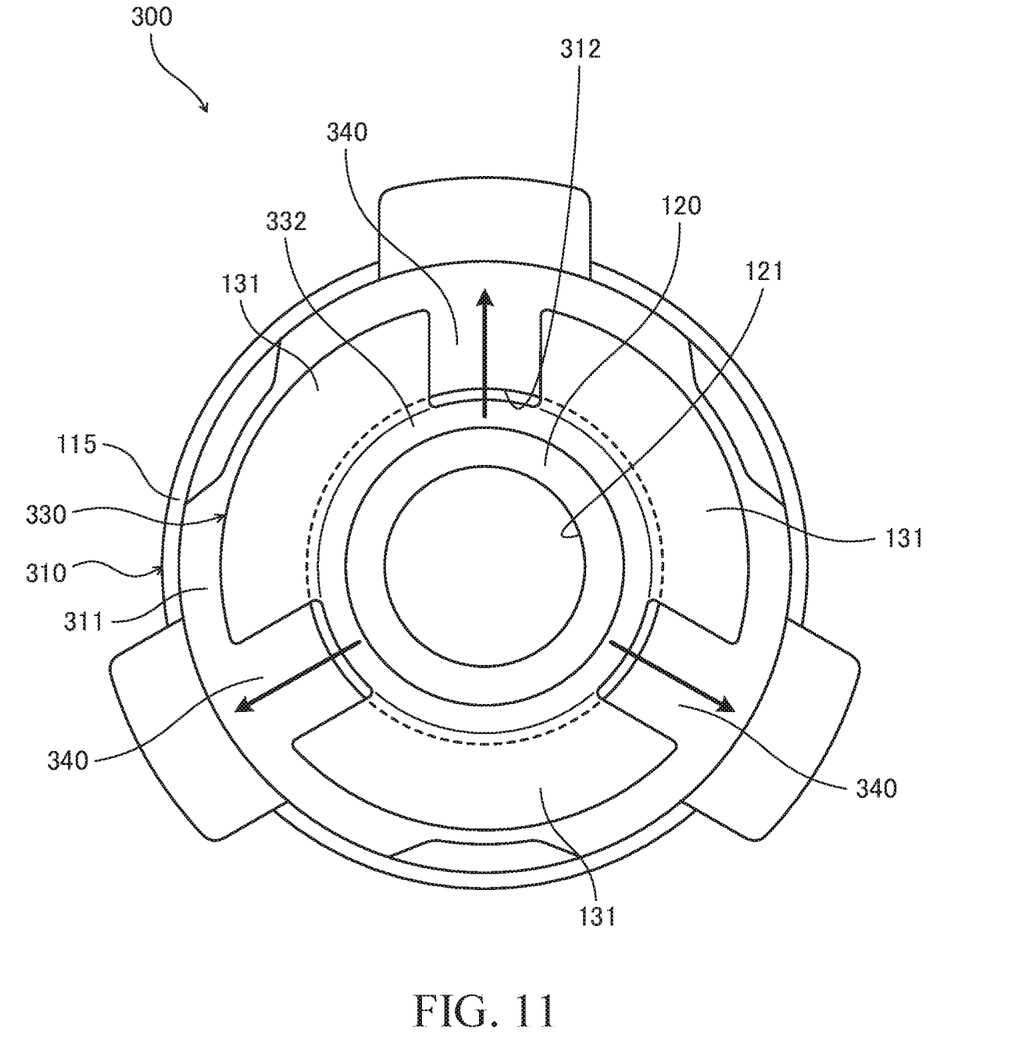
FIG. 11 is a bottom view of the bump stopper shown in FIG. 10.

FIG. 10 is a cross-section view of a shock absorber 3 provided with the bump stopper 300. FIG. 11 is a bottom view of the bump stopper 300.

The bump stopper 300 includes: a cap 310; the stopper 120; and a collar 330 provided to the inside of the cap 310. A circular rod hole 312 is formed in a plate-shaped part 311 of the cap 310. The piston rod 30 can be inserted into the rod hole 312.

A connection part 332 of the collar 330 is positioned more toward the inside in the radial direction than the circular inner peripheral surface of the rod hole 312. In addition, the connection part 332 is formed to be depressed relative to the support parts 131.

If the connection parts 232 are depressed so as to fit into the openings 112c as shown in FIG. 9, a raised part S of the depression is formed in the flow passage cross-section of the passages 240. The passages 240 are narrowed by an amount equivalent to the raised part S.

In the present embodiment, since the connection part 332 is positioned more toward the inside in the radial direction than the circular inner peripheral surface of the rod hole 312, there is no raised part of the depression in the flow passage cross-section of the passages 340, and the width of the passages 340 is expanded. Therefore, flow resistance in the passages 340 can be reduced, and fluid and dust that have flowed into the cap 310 from the rod hole 312 can be more reliably discharged to the outside of the cap.

The connection part 332 of the collar 330 is formed in an annular shape and includes a third rod hole 333. The piston rod 30 can be inserted into the third rod hole 333. The plurality of support parts 131 are disposed on the outer periphery of the annular connection part 332. The collar 330 is fixed to the cap 310 by joining the connection part 332 and the inner peripheral surface of the rod hole 312 of the plate-shaped part 311.

The connection part 332 is disposed within the rod hole 312 of the plate-shaped part 311. Therefore, the connection part 332 is not covered by the cap 310. Thus, when the collar 330 is fixed to the cap 310, the connection part 332 can be seen from the outside of the cap 310, and the connection part 332 can be easily joined to the inner peripheral surface of the rod hole 312 of the plate-shaped part 311.

The connection part 332 may or may not contact the stopper 120.

In addition to the effects achieved by the bump stoppers 100 and 200 according to the first and second embodiments, the bump stopper 300 also achieves the following effects.

Since the connection part 332 is not covered by the cap 310, when the collar 330 is fixed to the cap 310, the connection part 332 can be seen from the outside of the cap 310, and the connection part 332 can be easily joined to the inner peripheral surface of the rod hole 312 of the plate-shaped part 311.

The operation of the shock absorber 3 is basically the same as that of the shock absorber 1, and thus an explanation thereof will be omitted herein.

The constitution, operation, and effects of the embodiments of the present invention will now be summarized below.

In the present embodiments, the bump stopper 100, 101, 200, 300 absorbs shocks generated during maximum contraction of the shock absorber 1, 2, 3 in cooperation with the bump cushion 40. The bump stopper 100, 101, 200, 300 includes the following: the cap 110, 310 provided with the plate-shaped part 111, 311 having the rod hole 112, 312 into which the piston rod 30 of the shock absorber 1, 2, 3 inserted, and the cylindrical part 115 configured to receive a portion of the cylinder 10 of the shock absorber 1, 2, 3; the stopper 120 provided to the plate-shaped part 111, 311 and configured to receive the bump cushion 40; and the collar 130, 230, 330 provided to the plate-shaped part 111, 311 opposing the cylinder 10.

In the above constitution, since the collar 130, 230, 330 is provided to the plate-shaped part 111, 311 opposing the cylinder 10, it is not necessary to form the cap 110, 310 in a complex shape. Therefore, the bump stopper 100, 101, 200, 300 which is easy to manufacture and has sufficient strength can be provided.

In the present embodiments, in the bump stopper 100, 101, 200, 300, the collar 130, 230, 330 includes the plurality of support parts 131 arranged in a radial manner on the plate-shaped part 111, 311 and configured to support the plate-shaped part 111, 311, and the passages 140, 240, 340 which is configured to allow the rod hole 112, 312 to communicate with the outside of the cap 110, 310 via the inside of the cylindrical part 115, are formed by the cap 110, 310 and the collar 130, 230, 330. The passages 140, 240, 340 are formed between adjacent support parts 131.

In the above constitution, since the passages 140, 240, 340 are formed between adjacent support parts 131, the passage forming portions of the plate-shaped part 111, 311 are supported by the support parts 131 on both sides, and thus these passage forming portions do not easily deform. Therefore, deformation of the cross-section shape of the passages 140, 240, 340 can be prevented, and fluid and dust that have flowed into the cap 110, 310 from the rod hole 112, 312 can be more reliably discharged to the outside of the cap 110, 310.

In the present embodiments, in the bump stopper 100, 200, 300, the collar 130, 230, 330 further includes the connection parts 132, 232, 332 that connect adjacent support parts 131.

In the above constitution, since the connection parts 132, 232, 332 connect adjacent support parts 131, the plurality of support parts 131 are integrated by the connection parts 132, 232, 332. Thus, the collar 130, 230, 330 can be easily handled.

In the present embodiments, in the bump stopper 100, the rod hole 112 has the openings 112c, and the connection parts 132 are positioned more toward the inside in the radial direction than the inner peripheral surface of the openings 112c and are formed in a planar shape along the support parts 131.

In the above constitution, since the connection parts 132 are formed in a planar shape along the support parts 131, the collar 130 is simple. In addition, the collar 130 can be produced easily because it is not necessary to produce the collar 130 in consideration of a gap between the connection parts 132 and the stopper 120 so as to avoid contact between the connection parts 132 and the stopper 120.

In the present embodiments, in the bump stopper 200, the rod hole 112 has the openings 112c, and the connection parts 232 are positioned more toward the inside in the radial direction than the inner peripheral surface of the openings 112c and are formed to be depressed relative to the support parts 131.

In the above constitution, since the connection parts 232 are formed to be depressed relative to the support parts 131, the passages 240 are formed linearly along the end surface of the cylinder 10. Therefore, flow resistance in the passages 240 can be reduced, and fluid and dust that have flowed into the cap 110 from the rod hole 112 can be more reliably discharged to the outside of the cap 110.

In the present embodiments, in the bump stopper 300, the rod hole 312 is circular, and the connection part 332 is positioned more toward the inside in the radial direction than the circular inner peripheral surface of the rod hole 312 and is formed to be depressed relative to the support parts 131.

In the above constitution, since the connection part 332 is positioned more toward the inside in the radial direction than the circular inner peripheral surface of the rod hole 312, there is no raised part of the depression in the flow passage cross-section of the passages 340, and the width of the passages 340 is expanded. Therefore, flow resistance in the passages 340 can be reduced, and fluid and dust that have flowed into the cap 310 from the rod hole 312 can be more reliably discharged to the outside of the cap 310.

In the present embodiments, in the bump stopper 300, the connection part 332 is formed in an annular shape and is disposed within the rod hole 312 of the plate-shaped part 311.

In the above constitution, since the annular connection part 332 is disposed within the rod hole 312, the connection part 332 is not covered by the cap 310. Thus, when the collar 330 is fixed to the cap 310, the connection part 332 can be seen from the outside of the cap 310, and the connection part 332 can be easily joined to the inner wall surface of the rod hole 312.

In the present embodiments, in the bump stopper 101, the plurality of support parts 131 are separated from each other.

In the above constitution, since the plurality of support parts 131 are separated from each other, there are no members such as the connection parts 132 between adjacent support parts 131, and thus the width of the passages 140 is expanded. Therefore, flow resistance in the passages 140 can be reduced, and fluid and dust that have flowed into the cap 110 from the rod hole 121 can be more reliably discharged to the outside of the cap 110.

In the present embodiments, the bump stopper 100, 101, 200, 300 is characterized in that the inner peripheral surface of the stopper 120 is positioned more toward the inside in the radial direction than the inner peripheral surface of the rod hole 112, 312 of the plate-shaped part 111, 311.

In the above constitution, since the inner peripheral surface of the stopper 120 is positioned more toward the inside than the inner peripheral surface of the rod hole 112, 312, of the plate-shaped part 111, 311, the gap between the stopper 120 and the piston rod 30 is smaller than the gap between the inner peripheral surface of the rod hole 112, 312 and the piston rod 30. Thus, regardless of the size of the rod hole 112, 312, the bump cushion 40 does not readily enter into the gap between the stopper 120 and the piston rod 30, and breakage of the bump cushion 40 can be prevented.

In the present embodiments, the shock absorber 1, 2, 3 is characterized by including the bump stopper 100, 101, 200, 300 described above and the piston rod 30 inserted into the rod hole 112, 312, wherein the flow passage cross-section of the passages 140, 240, 340 is larger than the flow passage cross-section in the gap between the stopper 120 and the piston rod 30.

In the above constitution, since the flow passage cross-section of the passages 140, 240, 340 is larger than the flow passage cross-section in the gap between the stopper 120 and the piston rod 30, fluid and dust that have flowed into the passages 140, 240, 340 from this gap do not easily stagnate within the passages 140, 240, 340. Thus, fluid and dust that have flowed into the cap 110, 310 from the rod hole 112, 312 can be more reliably discharged to the outside of the cap 110, 310.

Embodiments of this invention were described above, but the above embodiments are merely examples of applications of this invention, and the technical scope of this invention is not limited to the specific constitutions of the above embodiments.

This application claims priority based on Japanese Patent Application No. 2015-227816 filed with the Japan Patent Office on Nov. 20, 2015, the entire contents of which are incorporated into this specification.

The invention claimed is:

1. A bump stopper for absorbing shocks generated during maximum contraction of a shock absorber in cooperation with a bump cushion, the bump stopper comprising:
a cap including a plate-shaped part and a cylindrical part, the plate-shaped part having a first surface, a second surface opposite to the first surface, and a rod hole penetrating through the plate-shaped part between the first surface and the second surface and configured to allow a piston rod of the shock absorber to be inserted in the rod hole, the cylindrical part extending from the plate-shaped part to a side of the first surface and being configured to receive a portion of a cylinder of the shock absorber;
a stopper provided on the second surface of the plate-shaped part, the stopper being configured to receive the bump cushion; and
a collar provided on the first surface of the plate-shaped part opposing the cylinder,
wherein the collar comprises a plurality of support parts arranged in a radial manner on the plate-shaped part, the plurality of support parts being configured to support the plate-shaped part,
a passage is formed by the cap and the collar, the passage being configured to allow the rod hole to communicate with an outside of the cylindrical part via an inside of the cylindrical part, and
the passage is formed between the adjacent support parts.

2. The bump stopper according to claim 1, wherein the collar further comprises a connection part configured to connect the adjacent support parts.

3. The bump stopper according to claim 2, wherein the rod hole has an opening, and
the connection part is positioned to straddle the opening, the connection part being formed in a planar shape along the support parts.

4. The bump stopper according to claim 2, wherein the rod hole has an opening, and
the connection part is positioned to straddle the opening, the connection part being formed to be depressed relative to the support parts.

5. The bump stopper according to claim 2, wherein the rod hole is circular, and
the connection part is formed to be depressed relative to the support parts and is disposed within the rod hole of the plate-shaped part.

6. The bump stopper according to claim 5, wherein the connection part is formed in an annular shape and is disposed within the rod hole of the plate-shaped part.

7. The bump stopper according to claim 1, wherein the plurality of support parts are separated from each other.

8. The bump stopper according to claim 1, wherein:
the stopper is formed with a hole configured to allow the piston rod to be inserted in the hole; and
an inner diameter of the stopper is smaller than an inner diameter of the rod hole of the plate-shaped part.

9. A shock absorber comprising:
the bump stopper according to claim 1; and
a piston rod that is inserted into the rod hole of the plate-shaped part,
wherein a flow passage cross section of the passage is larger than a flow passage cross-section in a gap between the stopper and the piston rod.

10. The bump stopper according to claim 1, wherein the stopper and the collar are fixed to the cap by projection welding.

* * * * *